Jan. 12, 1960　　　　　S. S. KOLODIN　　　　　2,920,871
AUTOMOBILE JACK

Filed April 26, 1957　　　　　　　　　　　　2 Sheets-Sheet 1

INVENTOR
SAMUEL S. KOLODIN
BY
ATTORNEY.

Jan. 12, 1960 S. S. KOLODIN 2,920,871
AUTOMOBILE JACK
Filed April 26, 1957 2 Sheets-Sheet 2

INVENTOR
SAMUEL S. KOLODIN
BY
ATTORNEY.

United States Patent Office 2,920,871
Patented Jan. 12, 1960

2,920,871
AUTOMOBILE JACK

Samuel S. Kolodin, New City, N.Y.

Application April 26, 1957, Serial No. 655,373

1 Claim. (Cl. 254—122)

This invention relates to an automobile jack.

Automobile jacks in past years have been applied to the axles or like parts of automobiles and other motor vehicles. In time the trend was to bumper jacks for greater accessibility and ease of operation. In modern body design, however, bumper jacks cannot be used for want of sufficient clearance between the bumpers and adjacent body parts.

It is accordingly the object of this invention to provide an automobile jack which is engageable with the frame or chassis of modern automobiles and which is applied thereto from the side of the vehicle.

It will be understood that when a motor vehicle is raised from the side, it tilts and pivots on the wheels opposite the side being raised. For this reason, the elevated side does not rise in a straight path but instead moves in a curved path having a radius of curvature approximating the distance from the line of contact between the wheels and the road on the opposite side of the vehicle to the frame member which the jack engages. It would therefore not suffice for the purposes of this invention if the jack traveled a straight vertical path.

The important feature of this invention is a jack mechanism which causes the lifting pad of the jack to travel in a curved path corresponding, substantially, to the path of movement of the vehicle frame member which said pad engages. This is accomplished in two ways: In the first place, the jack linkages are disposed on vertically offset pivots. In the second place, the linkages are provided with inter-engaging or meshing toothed portions of unequal radii.

Another important feature of this invention is the provision of interlocking brackets on the jack and automobile chassis which fit the jack to the chassis and hold the two together during the lifting and lowering operations. There are many advantages to this feature. For example, the chassis brackets (there may be one on each side of the vehicle or two on each side, one bracket for each wheel) position the jack at mathematically evolved points. There is no chance that the jack might be placed by a novice at the wrong place. Nor is there any chance of slippage or dislodgment of the jack relative to the vehicle. Once the vehicle rests its weight upon the jack, the two are interlocked and the jack cannot become dislodged from the vehicle nor can the jack lose its footing on the road. As is well known, a hazard with conventional jacks is that they will either lose their grip on the vehicle or on the road. Slippage of the load lifting hook relative to the bumper or the base of the jack relative to the road is a known hazard. In the present case, the interlocking brackets on the jack and vehicle chassis prevent any such slippage either between the jack and the chassis or between the jack and the road.

The invention is illustrated in the accompanying drawing in which.

Figure 1:
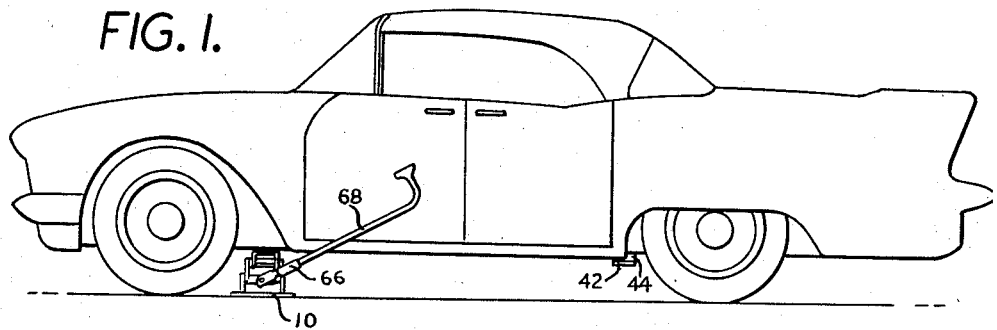
Fig. 1 is a side view of a motor vehicle showing the jack herein claimed in engagement therewith.
Figure 2:
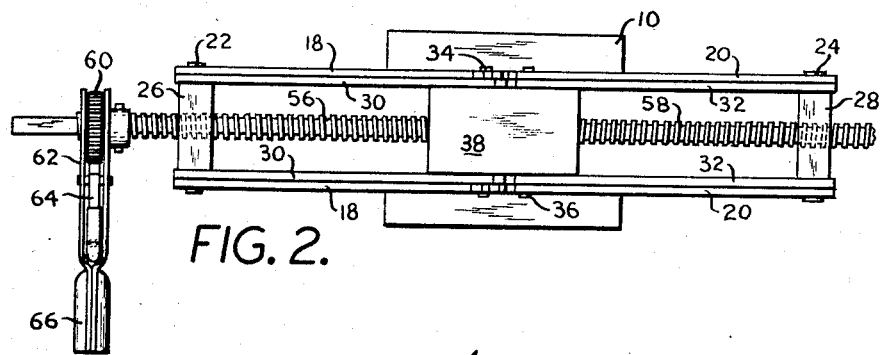
Fig. 2 is a top view of said jack.
Figure 3:
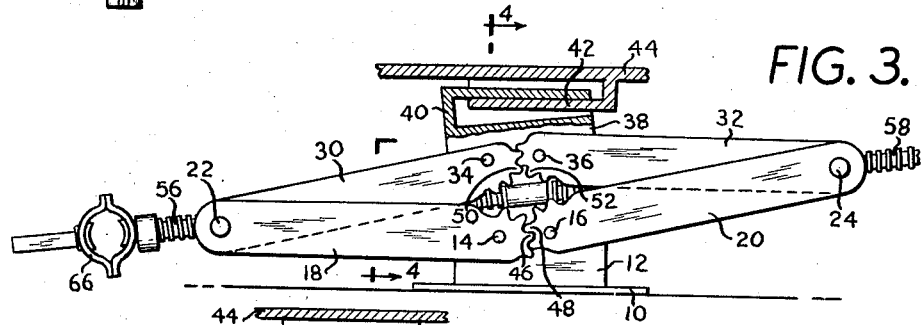
Fig. 3 is a side view of the jack showing it in lowered position.
Figure 4:
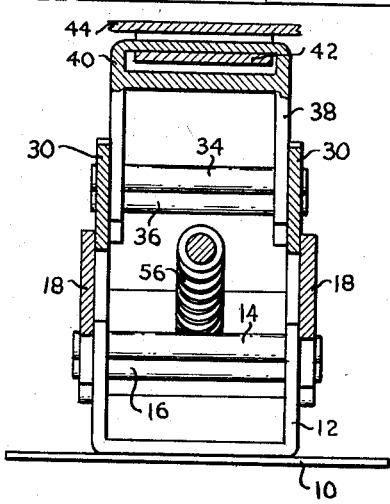
Fig. 4 is a vertical section on the line 4—4 of Fig. 3.

The automobile jack herein claimed is provided with a base 10 including a U-shaped bracket 12 on which the movable parts of the jack are supported. Two pins 14 and 16 are supported at their respective ends by the two arms of said U-shaped bracket 12. It will be noted that these pins are offset both horizontally and vertically from each other, pin 14 being disposed somewhat above and to the left of pin 16 as viewed in Fig. 5. Pivotally supported at their lower ends on these two pins are links 18 and links 20. Although Fig. 5, for example, shows only one link 18 and one link 20, it will be understood that on the opposite side of the jack is an identical pair of links.

At the upper ends of links 18 are pins 22 and at the upper ends of links 20 are pins 24. Pins 22 pivotally connect the upper ends of links 18 to a nut 26. By the same token, these pins 22 pivotally secure the lower ends of links 30 both to said nut 26 and to links 18. Pins 24 pivotally secure links 20 and links 32 to each other and to a second nut 28. It will now be noted that the upper ends of links 30 are pivotally secured by means of a pin 34 to a bracket 38 which is of generally inverted U shape. Pin 36 pivotally secures the upper ends of links 32 to said bracket 38. It will be noted that pins 34 and 36 are offset from each other both horizontally and vertically in the same relation and to the same extent that pins 14 and 16 are offset from each other.

Secured to the yoke of inverted U-shaped bracket 38 is a U-shaped locking member 40 which is disposed on its side, that is, with its lower arm secured to the yoke of bracket 38 and with its upper arm supported a spaced distance above said yoke. It will now be seen that a tongue 42 is provided on frame member 44 of the vehicle, said tongue 42 being substantially parallel to said frame member and disposed a spaced distance below said frame member.

Figure 5:
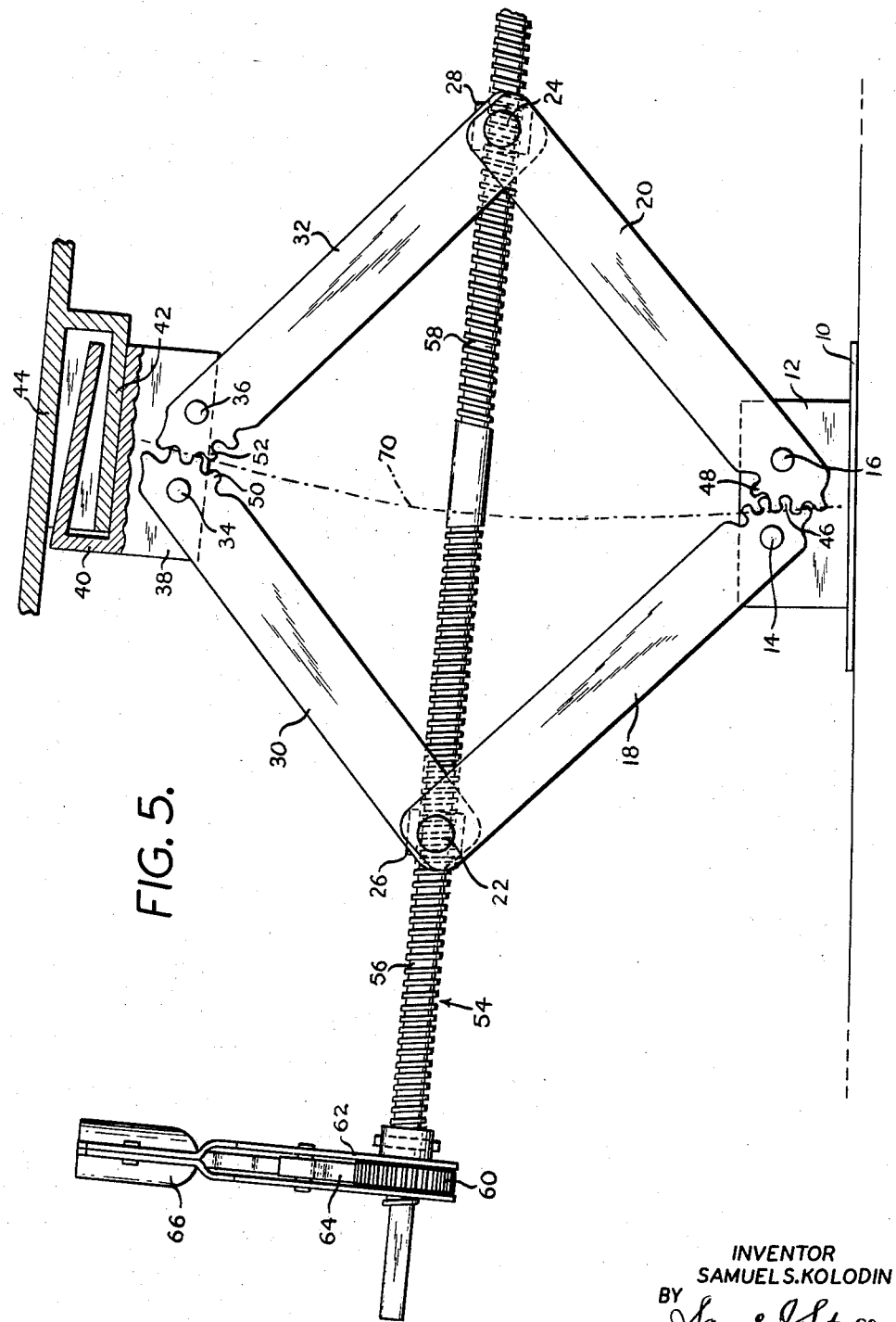
Fig. 5 is another side view of the jack showing it in elevated position.

It will now be observed, for example, in Fig. 5, that the U-shaped bracket 40 is engageable with the tongue 42 to locate the jack relative to the chassis. Tongue 42 may be struck out of the frame member 44 and it may be secured to or continuous with said frame member on three sides, that is, on all sides except the one side which remains open to receive the upper arm of U-shaped bracket 40. This would give tongue 42 adequate structural strength and enable it to support the load of the vehicle on the yoke of the jack. The clearance between tongue 42 and frame member 44 is such that when the jack is raised to elevating position, the yoke of bracket 38 will engage tongue 42 while the upper arm of U-shaped bracket 40 will float between said tongue 42 and the frame member 44 without touching either.

In other words, the upper arm of U-shaped bracket 40 functions only to locate the jack relative to the tongue 42 and at no time does it support the load of the vehicle. The U-shaped bracket 40 also helps support the jack in upright position, when it is in engagement with tongue 42 and when the weight of the vehicle does not rest upon the jack, especially when the operator of the jack is engaged in raising or lowering it.

It will now be observed that the lower ends of links 18 are provided with toothed portions 46, the lower ends of links 20 are provided with toothed portions 48, the upper ends of links 30 are provided with toothed portions 50, and the upper ends of links 32 are provided with toothed portions 52. It will be understood that each toothed portion above mentioned constitutes, in effect, a segment of a gear or a quadrant. Toothed portions 46 and 48 engage each other and toothed portions 50 and 52 also engage each other. It will be seen in the drawing and understood that the radii of toothed portions 46 and 50 are identical and that the radii of toothed portions 48 and 52 are also identical but that the radii of toothed portions 46 and 50 are somewhat smaller than the radii of toothed portions 48 and 52. Stated differently, portions 46 and 50 are segments or quadrants of a smaller gear than portions 48 and 52.

It will now be seen that the two nuts 26 and 28 are mounted on a generally horizontally disposed screw 54. This screw, however, is provided with right-hand threads 56 at one end and left-hand threads 58 at the opposite end and it will be understood that the nuts correspond to these threads. Consequently, when screw 54 is caused to rotate in one direction, the two nuts move toward each other thereby raising the jack and more particularly bracket 38 thereof. When the screw is caused to rotate in the opposite direction, the two nuts will move away from each other and cause the jack to lower, that is, bracket 38 to descend.

The means whereby the screw may be caused to rotate is best shown in Fig. 5. It will be noted that a ratchet wheel 60 is provided at one end of screw 54 and a bracket 62 is pivotally mounted on said screw on opposite sides of the ratchet wheel. A pawl 64 is carried by bracket 62 and said pawl engages the ratchet in conventional manner. At the upper end of bracket 62 is a socket member 66 which is adapted to receive a handle 68. This handle may be hand-actuated or foot-actuated in order to drive the screw through the ratchet.

The path of movement of bracket 38 is not in a straight line nor is it a truly vertical path. Instead, it travels a curved path as indicated by the interrupted line 70 in Fig. 5. This curved path results from the offset relation of pins 16 and 36 relative to pins 14 and 34 and the difference in radius between the toothed portions 48 and 52 on the one hand and 46 and 50 on the other hand.

The curved path thus indicated is intended to correspond, substantially, to the curved path which frame member 44 travels during the lifting process. The wheels on the opposite side of the vehicle remain on the ground and they constitute the fulcrum on which the vehicle is caused to pivot.

It will be understood that the inter-engaging means on the jack and frame member of the vehicle are not limited to the brackets 40 and 42 shown in the drawing. Any suitable interlocking means may be provided for this purpose. Furthermore, the jack herein claimed is intended to function in connection with a motor vehicle having a conventional chassis without bracket formations or other engaging means such as tongue 42. In such case, the jack would not be provided with bracket 40 and instead the yoke of bracket 38 would bear up directly against frame member 44 or the like. Nor is the invention limited to other specific features above set forth such as the ratchet mechanism for operating the screw. Any conventional screw-turning means may be used. By the same token, it is not essential that the screw be provided with right and left-hand threads. A screw with a single thread may be employed and in such case a single nut at one end of the screw and a thrust bearing at the opposite end would substitute for the two nuts shown in the drawing. This is conventional structure.

The foregoing is illustrative of a preferred form of this invention and it will be understood that this form may be modified and other forms may be provided within the broad spirit of the invention and the broad scope of the claim.

I claim:

An automobile jack of the character described, comprising a base, a first pair of links pivotally secured at their lower ends to said base, a second pair of links pivotally secured at their lower ends to said base, a third pair of links pivotally secured at their lower ends to the upper ends of the first pair of links, a fourth pair of links pivotally secured at their lower ends to the upper ends of the second pair of links, a lifting bracket, the upper ends of the third pair of links being pivotally secured thereto, the upper ends of the fourth pair of links being also pivotally secured to said lifting bracket, the pivotal connections which connect the first and third pairs of links with the base and with the lifting bracket being offset, respectively, both horizontally and vertically, from the pivotal connections which connect the second and fourth pairs of links with said base and with said lifting bracket, a screw inter-engaging and connected to the pivotally connected ends of the first and third pairs of links on the one hand and the second and fourth pairs of links on the other hand, and means for rotating said screw, the lower ends of the first pair of links being provided with gear segments, the lower ends of the second pair of links being also provided with gear segments which mesh with the gear segments of the first pair of links, the upper ends of the third pair of links being provided with gear segments, and the upper ends of the fourth pair of links being also provided with gear segments which mesh with the gear segments of the third pair of links, the radii of the gear segments on the first and third pairs of links being identical, the radii of the gear segments on the second and fourth pairs of links being identical, the radii of the gear segments of the first and third pairs of links being different from the radii of the gear segments on the second and fourth pairs of links.

References Cited in the file of this patent

UNITED STATES PATENTS

| | | |
|---|---|---|
| 1,426,201 | Lanier | Aug. 15, 1922 |
| 1,612,447 | Larson et al. | Dec. 28, 1926 |
| 1,709,746 | Schwerin | Apr. 16, 1929 |
| 2,758,816 | Pickard et al. | Aug. 14, 1956 |